United States Patent
Honda et al.

[19]

[11] Patent Number: 5,995,310
[45] Date of Patent: Nov. 30, 1999

[54] MAGNETIC DISK DEVICE WITH DUMMY WRITE FUNCTION

[75] Inventors: Hidekazu Honda, Odawara; Koichi Ono, Hiratsuka; Haruhiko Hosokawa, Kanagawa-ken; Katsuhiro Tsuneta, Odawara, all of Japan

[73] Assignee: Hitachi, Ltd., Tokyo, Japan

[21] Appl. No.: 08/819,089

[22] Filed: Mar. 18, 1997

[30] Foreign Application Priority Data

Mar. 19, 1996 [JP] Japan ................................. 8-062466

[51] Int. Cl.⁶ ................................................. G11B 15/12
[52] U.S. Cl. ........................ 360/61; 360/62; 360/77.08; 360/53
[58] Field of Search ............................. 360/61, 62, 63, 360/77.08, 113, 31, 53, 66

[56] References Cited

U.S. PATENT DOCUMENTS

| | | | |
|---|---|---|---|
| 5,189,566 | 2/1993 | Christensen | 360/53 |
| 5,270,885 | 12/1993 | Satoh et al. | |
| 5,461,517 | 10/1995 | Suda | 360/60 X |
| 5,479,301 | 12/1995 | Takeuchi | |
| 5,682,272 | 10/1997 | Taroda et al. | 360/53 |

FOREIGN PATENT DOCUMENTS

| | | |
|---|---|---|
| 306715 | 3/1989 | European Pat. Off. |
| 5-282607 | 10/1993 | Japan |
| 6-111218 | 4/1994 | Japan |
| 7-287942 | 10/1995 | Japan |

*Primary Examiner*—Alan Faber
*Attorney, Agent, or Firm*—Fay, Sharpe, Beall, Fagan, Minnich & McKee

[57] ABSTRACT

A magnetic disk device of embedded-servo type is capable of performing dummy operation for suppressing waveform degradation of signal reproduced by magnetic heads at a high speed with high reliability. When a waveform deformation occurs in a No.0 head, a controller changes over the No.0 head to a No.1 head operating normally, whereupon a cylinder portion for which dummy operation is to be performed is sought on the basis of the servo information supplied from the No.1 head. The cylinder portion destined for the dummy write operation contains servo information at timing positions that are the same for the individual magnetic heads. When passing of the No.1 head over the cylinder portion is confirmed, the No.1 head is changed over to the No.0 head for performing dummy write operation for suppressing the waveform deformation of the reproduce signal outputted from the No.0 head. Before the timing for succeeding information, the No.1 head is restored-by issuing a head change command signal. Because the seek operation is realized exclusively by the magnetic head suffering no abnormality, the dummy write operation for preventing waveform deformation of the reproduced signal outputted from the No.0 head can be realized without fail.

8 Claims, 7 Drawing Sheets

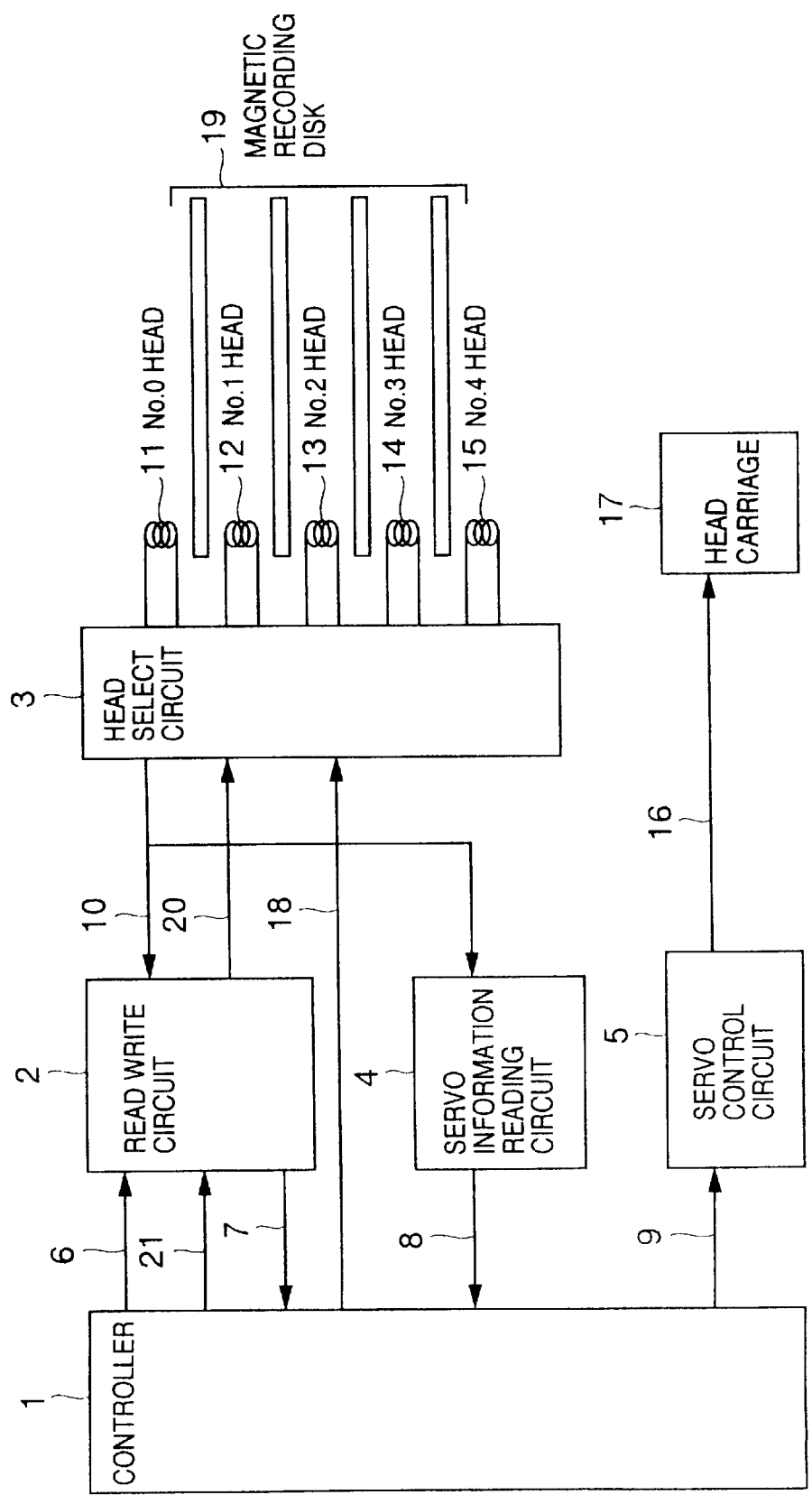

MAGNETIC DISK DEVICE WITH DUMMY WRITE FUNCTION

BACKGROUND OF THE INVENTION

The present invention relates generally to a magnetic disk device for writing and reading information on and from a plurality of disk-like magnetic recording media with a plurality of magnetic recording heads. More specifically, the invention is concerned with a dummy write technique for coping with such situation in which a reproduced signal derived from the output of a magnetic head suffers as problem such as deformation of signal waveform.

When a waveform deformation or the like abnormality makes appearance in a reproduced signal of a magnetic head of a magnetic disk device, such approach has heretofore been taken that a recording current for a magnetic head suffering abnormality is gradually decreased from a time point immediately after write operation to thereby regenerate the magnetic head in an effort to suppress the waveform deformation of the reproduced signal, as disclosed in JP-A-5-282607. As another approach for solving the problem mentioned above, there has been proposed such technique that dummy write operation is conducted at specific addresses by using the magnetic head suffering abnormality for thereby suppressing the waveform deformation by regenerating concerned the magnetic head, as disclosed in JP-A-6-111218.

With the method taught in JP-A-5-28267, there arises necessity for providing areas for effectuating suppression of the waveform deformation in all of sectors, respectively. As a result of this, however, effective storage capacity of the magnetic disk device as a whole decreases, which is of course undesirable.

On the other hand, according to the technique disclosed in JP-A-6-111218, it is sufficient to allocate a dummy write area of one sector to each of the magnetic head. Accordingly, the problem of the effective storage capacity of the magnetic disk device being decreased can essentially be avoided. However, when the magnetic disk device is of an embedded-servo type, problems mentioned below will be encountered.

The magnetic disk device of the embedded-servo type features that read/write operation is performed by a magnetic head selected currently and that seeking operation and following operation for a target track are conducted on the basis of servo information written or recorded on a disk of concern at a predetermined location.

Now, let's assume that some abnormality or irregularity occurs in a given magnetic head of the embedded-servo type magnetic disk device, as a result of which waveform of the reproduced signal outputted from that magnetic head varies or deforms to such extent that data recorded on the magnetic recording disk surface can not be read out correctly. In that case, the seeking operation and following operation are attempted in an effort to perform a dummy write operation at a specific address. In reality, however, the servo information recorded on the magnetic recording disk surface can not be read out because of abnormality of the magnetic head and hence deformation of the waveform of the reproduced signal involving seeking error or following operation error.

SUMMARY OF THE INVENTION

In the light of the state of the art described above, it is an object of the present invention to provide a magnetic disk device having a dummy write function which device is essentially immune to the problems of the conventional magnetic disk devices described above.

In view of the above and other objects which will become apparent as the description proceeds, it is proposed according to a general feature of the present invention that the seeking operation or following operation to a target track is performed after changing over a magnetic head suffering abnormality to a magnetic head operating normally by taking advantage of a fact that a probability of simultaneous occurrence of waveform deformation in reproduced signals outputted from a plurality of magnetic heads, respectively, is low.

In a mode for carrying out the invention, the magnetic head suffering abnormality is guided to a sector position for effectuating a dummy write operation by a magnetic head operating normally. Servo information is discretely recorded on the magnetic recording medium or disk. In a data area where the servo information is not written or recorded, a control circuit is changed over to the magnetic head suffering abnormality to thereby perform the dummy write operation, whereon control for the following operation is changed over to the normally operating magnetic head before the magnetic head performs the dummy write operation flies over a succeeding servo information area. To say in another way, change-over of the magnetic heads mentioned above is carried out during a period intervening between read-out operations for two adjacent ones of the servo information.

With the magnetic disk device according to the present invention, the seeking operation or following operation to a target track can be performed positively without fail by using the normally operating magnetic head upon dummy write operation for the magnetic head suffering abnormality, whereby the abnormal magnetic head can be guided (by seeing or following operation) to a location or portion (cylinder) where the dummy write operation is to be performed.

In a preferred mode for carrying out the invention, only the dummy write operation is performed for the magnetic head suffering abnormality. Since the magnetic head can not perform the following operation or the seeking operation by reading the servo information immediately after the regeneration, no adverse influence can not be exerted to the following operation performed till then by using the normal magnetic head.

These and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 1 is a block diagram showing schematically a general configuration of a magnetic disk device according to an embodiment of the present invention;

DESCRIPTION OF THE PREFERRED EMBODIMENTS

Now, the present invention will be described in detail in conjunction with what is presently considered as preferred or typical embodiments thereof by reference to the drawings.

Figure 5:
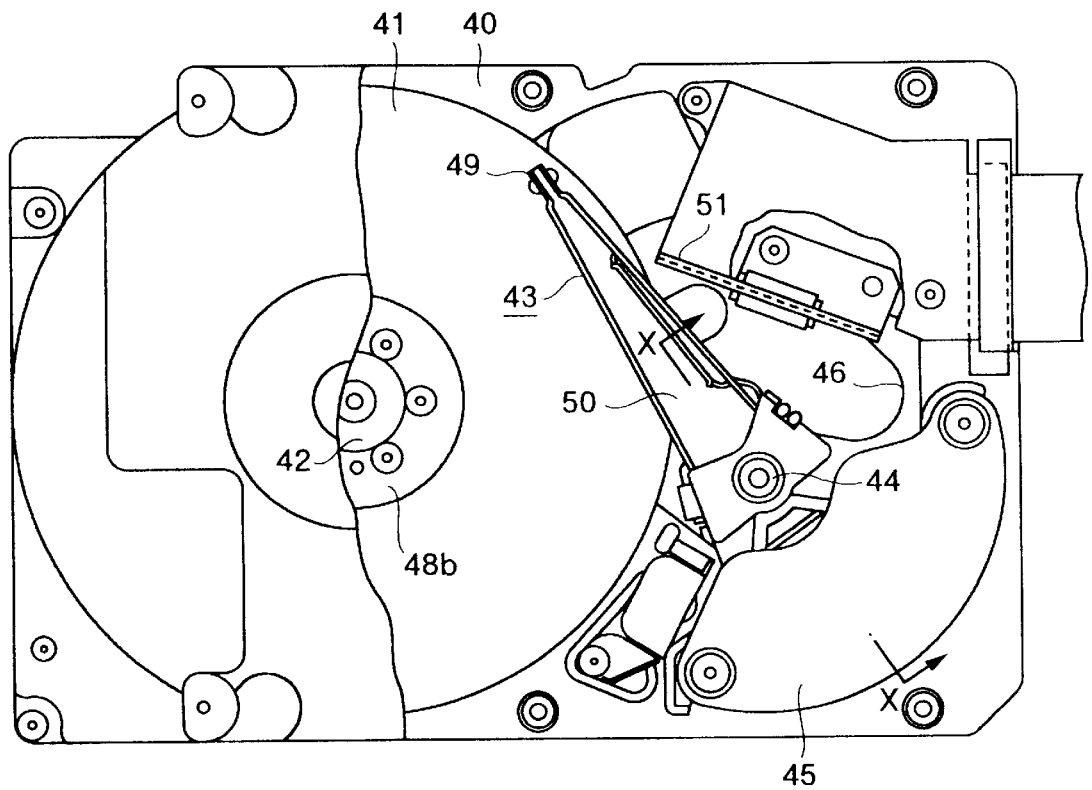
FIG. 5 is a plan view showing a structure of a magnetic disk device according to an embodiment of the present invention.
Figure 6:
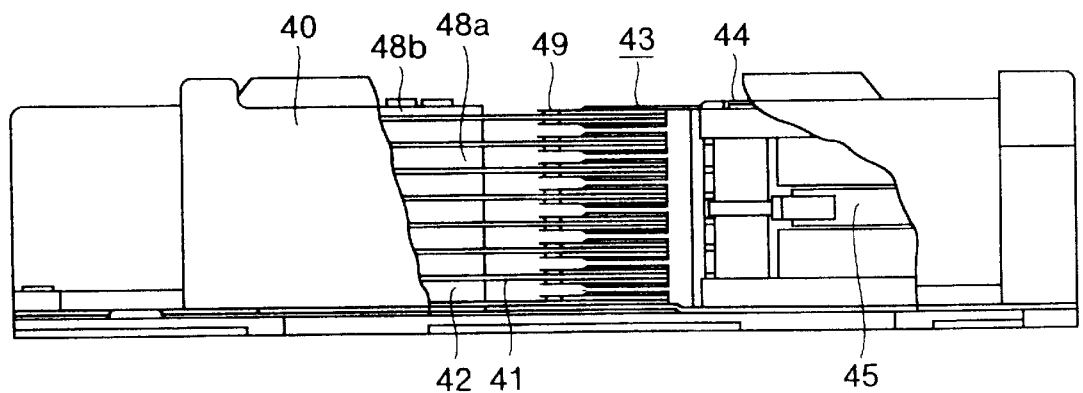
FIG. 6 is a side elevational view showing the same with a portion being broken away.

Referring to FIGS. 5 and 6, a mechanical structure of a magnetic disk device according to an embodiment of the present invention will first be described.

As can be seen in the figures, the magnetic disk device is comprised of an enclosing case 40 (see FIG. 5), magnetic recording disks 41 each serving as a magnetic recording medium, a spindle motor 42 for supporting and rotationally driving the magnetic recording disks 41, a head assembly 43 including magnetic heads for writing/reading out information on/from the magnetic recording disks 41 and suspension arms, a swing arm including a pivot shaft 44 for supporting the head assembly 43 swingably over the magnetic recording disks 41, a voice coil motor 45 for driving the swing arm, a control circuit board 51 for controlling write and read operations of the magnetic heads performed for the magnetic recording disks 41, a controller 1 (not shown in FIGS. 5 and 6) for controlling operations or actuations of the spindle motor 42 and the pivot shaft 44, and a printed wiring board 46 for making electrical connections among the elements or components mentioned above. The magnetic recording disk 41, the spindle motor 42, the head assembly 43, a part of the printed wiring board 46 and the voice coil motor 45 are hermetically accommodated within the enclosing case 40.

The spindle motor 42 is constituted by a hub-housed type electric motor which includes a hub having an outer peripheral surface on which the magnetic recording disks 41 are fixedly mounted and a rotor and a stator disposed internally of the hub. The spindle motor 42 is installed on a base member constituting a part of the enclosing case 40. The magnetic recording disk 41 constitutes an important part of the magnetic disk device which determines the data storage capacity of the magnetic disk device. Usually, there may be incorporated two or several magnetic disks in dependence on a desired data storage capacity to be ensured for the magnetic disk device. In the case of the magnetic disk device according to the instant embodiment of the invention, it is presumed that a plurality of magnetic recording disks 41 are mounted on the outer peripheral surface of the hub of the spindle motor 42 alternately with disk spacers 48a which are interposed between the adjacent disks, respectively, as can be seen in FIG. 6. The disk stack constituted by the magnetic recording disks 41 and the disk spacers 48a disposed alternatively are clamped together by means of a disk clamp 48b in the direction axially of the spindle motor 42. In this manner, the magnetic recording disks 41 are fixedly secured to the spindle motor 42.

There are provided a number of swing arms which corresponds to that of the magnetic recording disks 41, wherein each of the swing arms is constituted by a slider 49 having the magnetic head mounted thereon and a suspension arm 50 (see FIG. 5). The swing arms are mounted on the base member rotatably or swingably by means of the pivot shaft 44. More specifically, the magnetic head may be implemented in the form of a dual-head type structure in which a thin-film magnetic head for writing information on the disk and a magnetoresistance-effect-type head for reading information from the disk are combined integrally or in coalition, wherein the dual-type magnetic head is mounted on the associated one of the sliders 49. Of course, the invention is never limited to the magnetic head mentioned above. Other types of heads such as an inductive head, a thin-film head, a MIG (Metal-In-Gap) head or the like may be employed in the magnetic disk device according to the invention.

In the magnetic disk device according to the instant embodiment of the invention, there is adopted a rotary actuator based on an embedded-servo schema, wherein servo information which can be reproduced periodically is recorded on one track. Further, a servo patterns (not shown) are written at positions determined by the magnetoresistance-effect-type head upon write operation of the thin-film or inductive head.

Figure 2A:
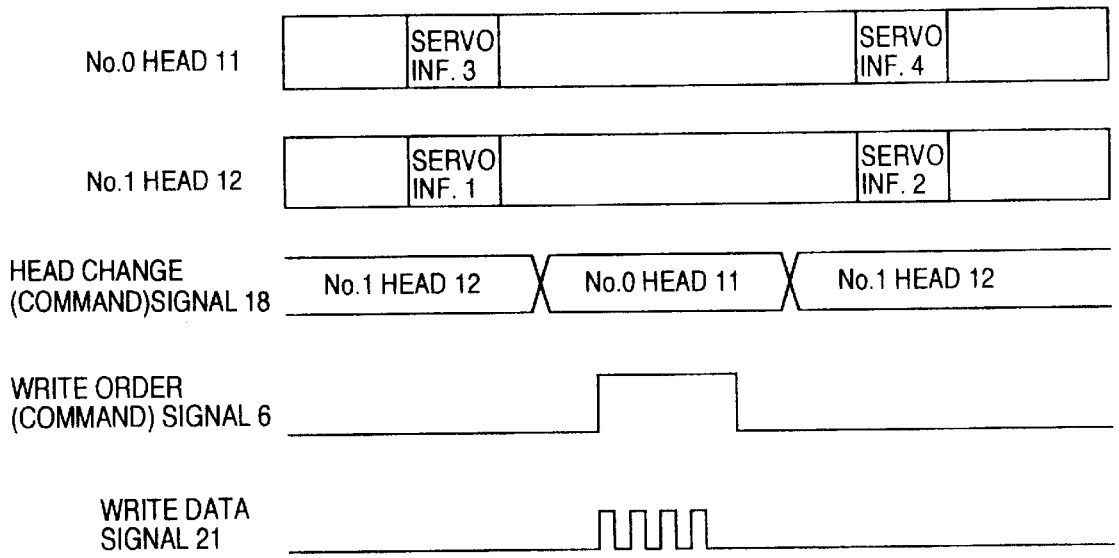
FIGS. 2A is a timing chart for illustrating operation of the magnetic disk device shown in FIG. 1.
Figure 2B:
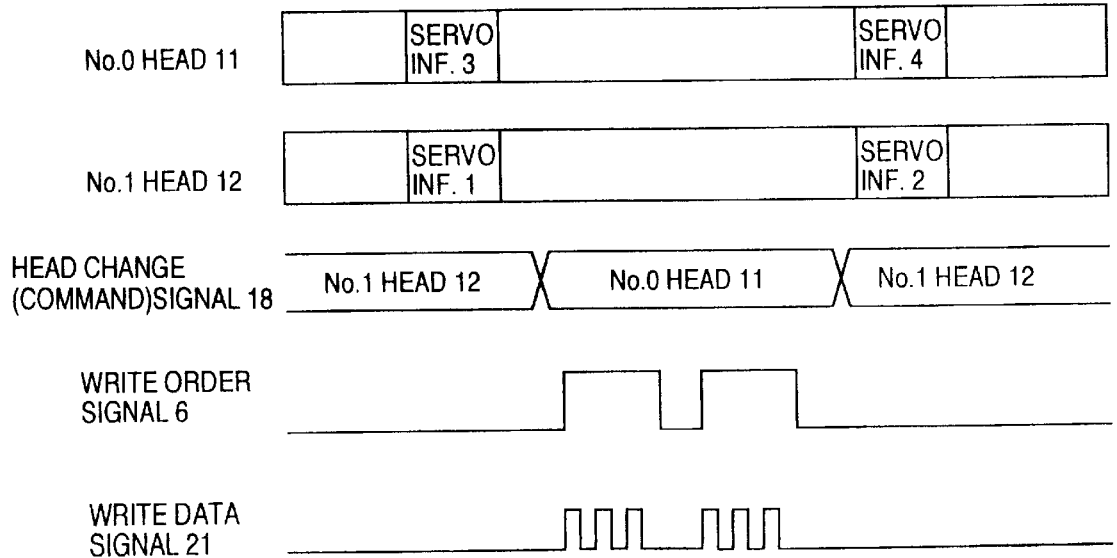
FIG. 2B is a timing chart for illustrating operation in which dummy write operation is performed twice in the operation shown in FIG. 2A.

FIG. 1 is a block diagram showing schematically an electric configuration of a magnetic disk device according to an embodiment of the present invention, and FIGS. 2A and 2B show timing charts for illustrating operations of the magnetic disk device shown in FIG. 1. Description will first be directed to the configuration of the magnetic disk device by reference to FIG. 1. It is assumed that there are provided five magnetic heads 11, 12, 13, 14 and 15 designated by identification numbers "No.0", "No.1", "No.2", "No.3" and "No.4", respectively. Hereinafter, these magnetic heads will be referred to as the No.0 head, the No.1 head and so forth. Of these magnetic heads 11 to 15, only one is selected by a head select circuit 3. To this end, the controller 1 issues a head change command signal 18 indicating the head identification number (No.). In response to the head change command signal 18, the head select circuit 3 selects the magnetic head designated by the head identification number issued by the controller 1.

Now, let's assume that the No.0 head 11 is selected by the head select circuit 3. In that case, the No.0 head 11 reads out data and servo information recorded magnetically on a disk surface of the magnetic recording disk 19 located in front of the No.0 head 11, whereby a read-out signal 10 is outputted to be supplied to both a read/write circuit 2 and a servo information reading circuit 4. The data contained in the head read-out signal 10 is extracted by the read/write circuit 2, whereon the data as extracted is supplied to the controller 1 as a read data signal 7. The controller 1 is imparted with a function or capability for making decision whether the data carried by the read data signal 7 as received is correct or not.

On the other hand, in the servo information reading circuit 4, only the servo information contained in the head read-out signal 10 supplied to the servo information reading circuit 4 is discriminatively extracted. In this conjunction, the servo information contains information concerning the current position of the No.0 head 11, i.e., the ID number of the track and that of the sector at which the magnetic head is currently positioned as well as information concerning the deviation or distance from the center of the track. All the contents of the servo information are informed to the controller 1 by the servo data signal 8. On the basis of the servo information as received, the controller 1 generates a servo control circuit control signal 9 for controlling a servo control circuit 5. In conformance with the control signal 9, the servo control circuit 5 outputs a carriage driving current signal 16 for driving a head carriage 17 to thereby realize the positioning of the magnetic head.

Next, the write operation in the magnetic disk device will be described. The controller 1 selects previously the magnetic head destined for write operation and outputs a corresponding head change command signal 18. Subsequently, the controller 1 issues a write data signal 21 containing data to be written and a write command signal 6 to the read/write circuit 2 for thereby commanding the read/write circuit 2 to perform write operation. Upon reception of the write operation command, the read/write circuit 2 issues a write command signal 20 to the head select circuit 3 for thereby making the selected magnetic head (No.0 magnetic head in this assumed case) perform write operation on the magnetic recording disk 19.

Next, assuming that waveform deformation takes place in the signal reproduced by the No.0 head 11, making impossible for the No.0 head 11 to read out information from the servo data recording area of the magnetic recording disk, description will be made of a regeneration method of the magnetic head according to the teachings of by the present invention by reference to FIG. 2.

In the first place, it should be mentioned that the regeneration method for the magnetic head suffering abnormality can be carried out recursively. More specifically, when a magnetic head selected in place of the abnormality suffering magnetic head is detected as suffering also from abnormality, another or third magnetic head is selected, whereon regeneration processing (dummy write operation) is performed for the abnormality suffering magnetic heads.

Furthermore, when the regeneration processing performed once for the abnormality suffering magnetic head failed to regenerate that magnetic head, the regeneration processing may be performed for the abnormality suffering magnetic head twice or more.

Two or more regeneration processings may be carried out during a period intervening between reproductions of two adjacent servo signals (see FIG. 2B) or during a period intervening between reproductions of other two adjacent servo signals.

Occurrence of waveform deformation in the output signal of the No.0 head 11 can be decided by the controller 1 on the basis of the data contained in the read data signal 7 outputted from the No.0 head 11 selected by the head select circuit 3. Upon decision of the waveform deformation in the reproduced signal outputted from the No.0 head 11, the controller 1 starts a waveform deformation suppressing operation.

At first, the controller 1 issues the head change command signal 18 commanding to change over of the No.0 head 11 to one of the other magnetic heads 12 to 15. At this juncture, let's assume, only by way of example, that the No.0 head 11 is changed over to the No.1 head 12. In that case, the servo information reading circuit 4 extracts the servo information from the head read-out signal 10 of the No. 1 head 12 and supplies all the servo information to the controller 1 as the servo data signal 8. The controller 1 then responds to the servo information transmitted by the servo data signal 8 to seek a relevant cylinder portion for effectuating the waveform deformation suppressing operation for the reproduced signal of the No. 1 head.

In cylinder portions for effectuating the waveform deformation suppressing operation, there are stored the servo information at same timing positions, as exemplified by the servo information 3 for the No.0 head 11 and the servo information 1 for the No.1 head 12 as well as the servo information 4 for the No.0 head 11 and the servo information 2 for the No.1 head 12, respectively, as can be seen in the timing chart shown in FIG. 2. When the controller 1 detects the servo information 1 for the No.1 head 12 and confirms that the servo information 1 has passed by beneath the No. 1 head 12, the controller 1 issues the head change command signal 18 for thereby changing over the No.1 head 12 again to the No.0 head 11 (i.e., the magnetic head suffering abnormality of waveform deformation). In response to the write command signal 6 and the write data signal 21, a dummy write operation for suppressing the waveform deformation of the signal reproduced by the No.0 head 11 is then performed.

Subsequently, prior to the flying of the No.0 head 11 over the succeeding servo information 2 immediately after the dummy write operation, the controller 1 issues the head change command signal 18 for thereby change over the No. 0 head 11 again to the No.1 head 12.

In the operation described above, the dummy write operation may be performed plural times (twice in the case of the instant embodiment of the invention), after the head change-over of the No.0 head 11 during a period intervening between reproductions of the mutually adjacent servo signals.

Next, by reference to FIGS. 3A, 3B, 4A and 4B, description will be made of locations on the magnetic recording disk at which the dummy write operation is to be performed.

Figure 3A:
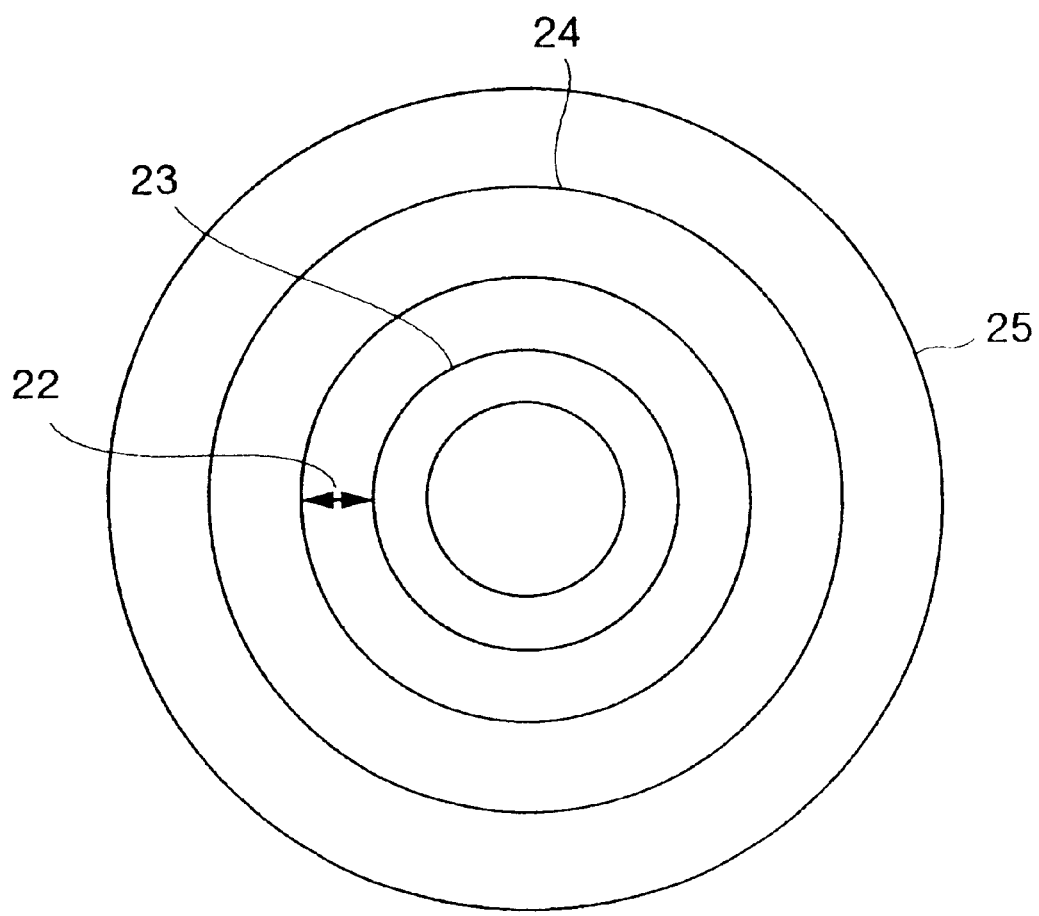
FIG. 3A is a plan view of a magnetic recording disk which can be employed in the magnetic disk device according to the invention and shows disposition of tracks provided substantially circularly and concentrically on the magnetic recording disk.

FIG. 3A is a plan view showing disposition of tracks traced substantially circularly and concentrically on the magnetic recording disk 25. In the case of the instant embodiment of the invention, an interval 22 is provided between a data and data management area 24 and a dummy write track 23 in such manner as illustrated in FIG. 3A with a view to protecting the data areas, i.e., the data and data management area 24, from being destroyed due to deviation of the dummy write location in the radial direction of the magnetic recording disk, which may be brought about by offset between the magnetic heads due to inclinations or the like event of the head carriage after the write operation of the servo information. In a preferred mode for carrying out the invention, the interval 22 should be so selected as to correspond at least two tracks as viewed in the radial direction of the disk.

Figure 3B:
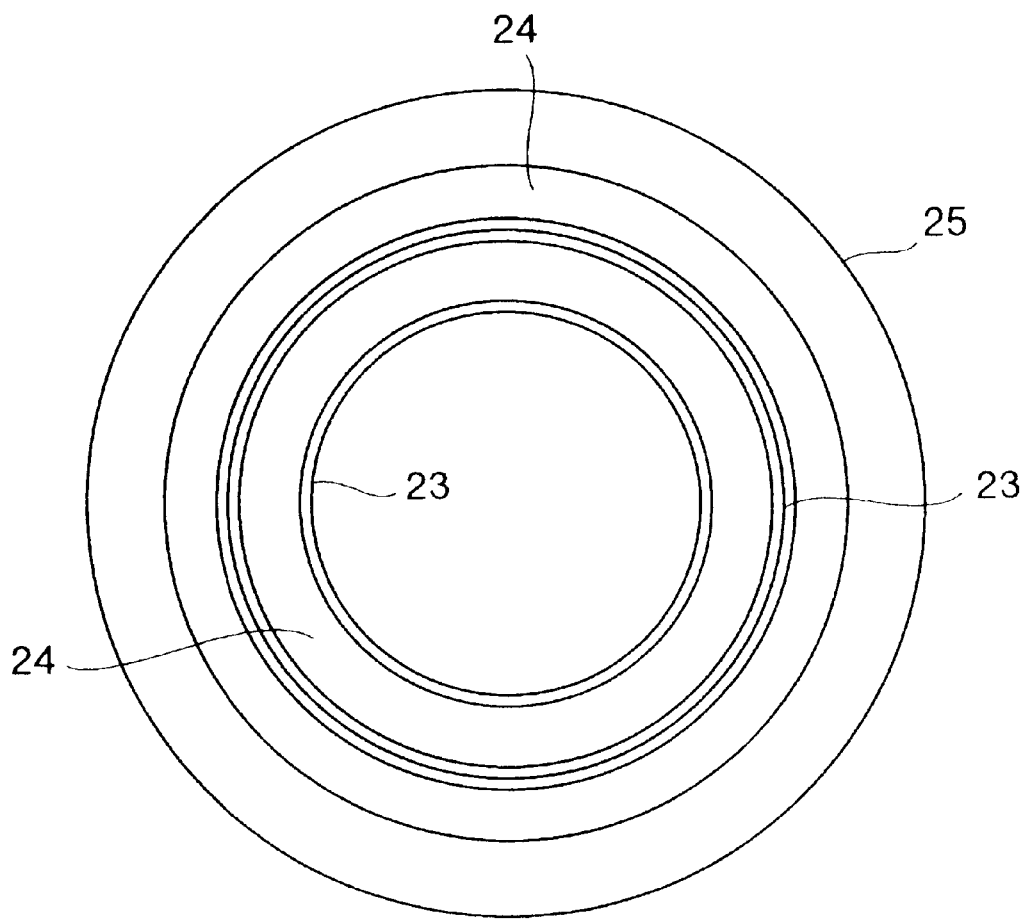
FIG. 3B is a plan view illustrating a modification of the magnetic recording disk shown in FIG. 3A and shows disposition of plural tracks provided substantially circularly and concentrically.

In the case of the magnetic recording disk according to another embodiment of the invention, two sets of data and data management areas 24 and the dummy write tracks 23 are provided, respectively. In this conjunction, it is to be mentioned that a plurality of data and data management areas 24 and dummy write tracks 23 should be provided, as illustrated in FIG. 3B, in order to complete within a short time the seeking operation upon dummy write operation.

Figure 4A:
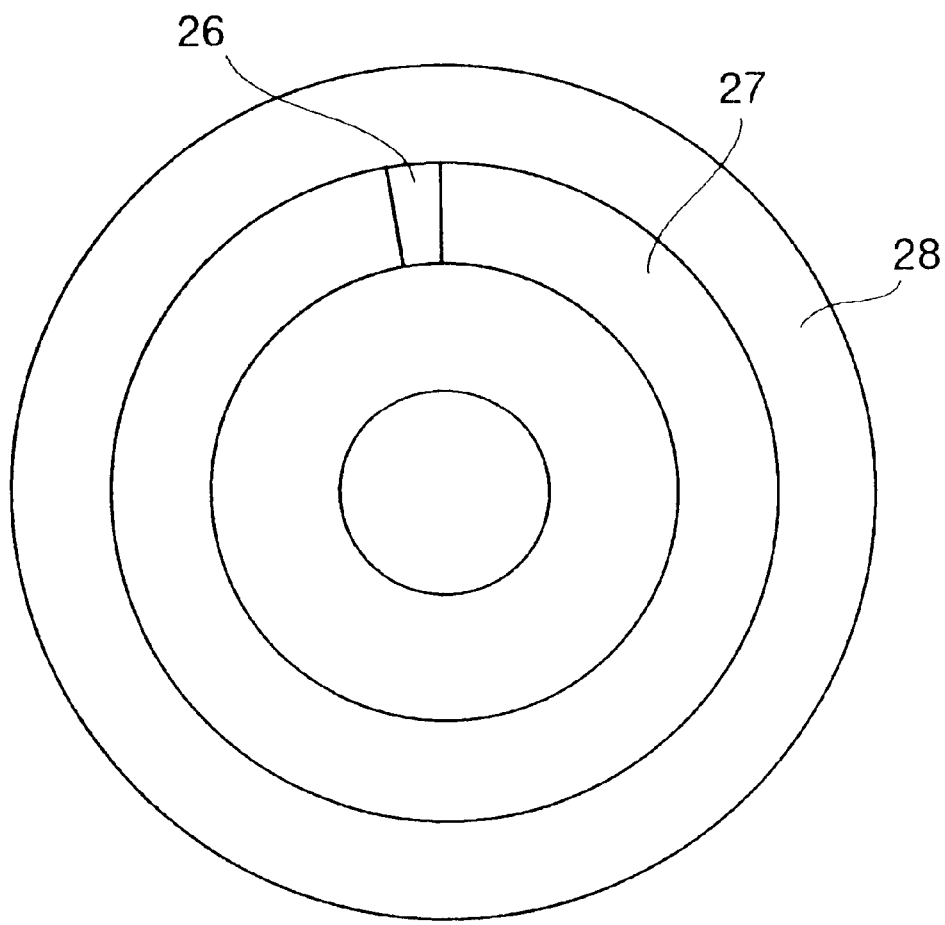
FIG. 4A is a plan view of a magnetic recording disk according to a second embodiment of the present invention.

FIG. 4A is a plan view showing a magnetic recording disk 28 according to a second embodiment of the present invention. In the case of the magnetic recording disks shown in FIGS. 3A and 3B, the location or portion(s) where the dummy write operation is to be performed is selected on the dummy write track(s) 23. By contrast, in the case of the magnetic recording disk 28 shown in FIGS. 4A and 4D, a dummy write area 26 is provided so as to extend substantially in a direction radially of the magnetic recording disk. To say in another way, the dummy write areas are provided on all the tracks within the data and data management area 27 at same timing positions. Due to the arrangement described above, substantially no time loss is involved in the seeking operation upon dummy write operation. In this case, the normal magnetic head (i.e., magnetic head suffering no abnormality) is employed for the following operation, and it is only during the period intervening between the adjacent servo information that the write operation is performed by changing over to the abnormal magnetic head for the dummy write operation.

Figure 4B:
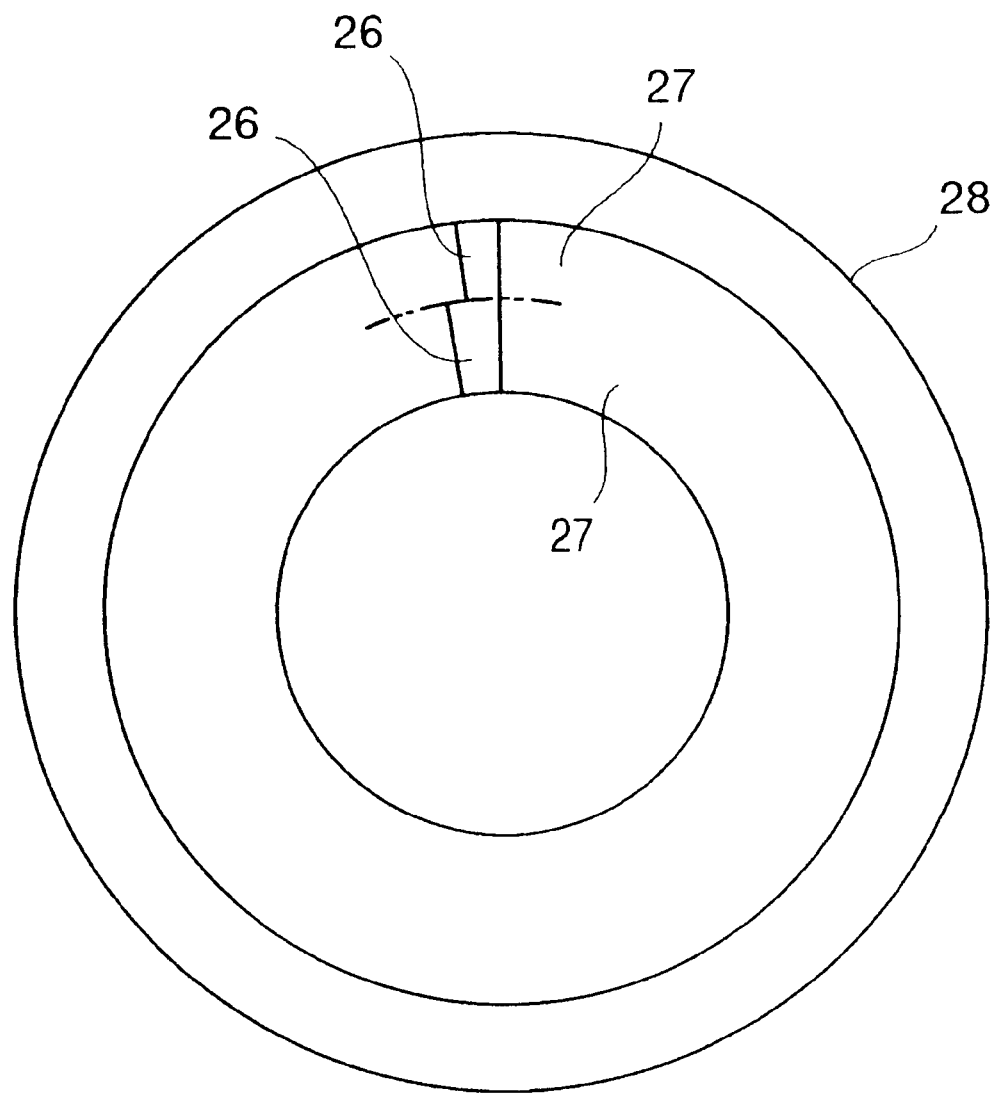
FIG. 4B is a plan view showing a modification of the magnetic recording disk shown in FIG. 4A in which a plurality of dummy write areas are disposed in a direction substantially radially of the magnetic recording disk.

In the case of the magnetic head shown in FIG. 4B, there are provided two areas, i.e., the data and data management area 27 and the dummy write area 26. When the dummy write area 26 shown in FIG. 4A is provided to the vicinity of the outer periphery of the magnetic recording disk 28, such situation may arise in which decrease in the storage capacity of the magnetic disk device can no more be ignored. In that case, the dummy write area 26 should preferably be divided into a plurality of subareas, as illustrated in FIG. 4B. Furthermore, in order to shorten the time taken for the abnormal magnetic head to arrive at the position above the dummy write area 26 in the magnetic recording disks shown in FIGS. 4A and 4B, a plurality of dummy write areas 26 may be provided on the disk 28.

At this juncture, it should be mentioned that the dummy write area 26 is shown to present such a shape in which an area defined between two circular arcs is delimited by two lines extending radially of the magnetic recording disk. However, this is only for the purpose of facilitating the understanding. In the strict sense, because the rotary actuator swings along a circular arc, the dummy write area 26 assumes such shape which is defined between two circular arcs and delimited by two circular arcs in the radial direction of the magnetic recording disk. At any rate, the dummy write area 26 may be so provided as to extend substantially along the radial direction of the magnetic disk or medium.

As can now be appreciated from the foregoing description, with the structure of the magnetic disk device according to the present invention, there can be obtained such advantageous effect that when abnormality takes place in the signal reproduced by the magnetic head due to a defect of the magnetic head itself, operation for regeneration of the magnetic head (i.e., dummy write operation) can be performed stably at a high speed with high reliability. Besides, by virtue of such arrangement that the magnetic head is used neither for the following operation nor seeking operation immediately after the dummy write operation, stable position control of the magnetic head can be ensured.

Having described preferred embodiments of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A magnetic disk device adopting a rotary actuator based on an embedded-servo scheme, comprising:
   a plurality of magnetic recording disks supported rotatably and storing discretely reproducible servo information;
   a plurality of magnetic heads for performing information read/write operation for said plurality of magnetic recording disks, respectively;
   an actuator for positioning one of said plurality of magnetic heads relative to one of said plurality of magnetic recording disks on the basis of said servo information;
   a controller for sending out a signal for selecting one of said plurality of magnetic heads and a signal commanding an information writing operation; and
   control circuits for controlling an information read/write operation performed for one of said plurality of magnetic recording disks, a reading operation of servo information from one of said plurality of magnetic recording disks and a driving operation of said actuator;
   wherein said controller, between two consecutive reproductions of servo information, sends a signal selecting a magnetic head from said plurality of magnetic heads, a signal instructing a write operation of information, and a signal selecting a magnetic head without a characteristic deterioration from said plurality of magnetic heads.

2. A magnetic disk device according to claim 1,
   wherein in response to said signal commanding the information write operation sent out from said controller, information corresponding to said signal is stored in the relevant recording disk in a circumferential direction at a location distanced from an area for data read/write tracks at least by two tracks in a direction radially of said magnetic recording disk.

3. A magnetic disk device according to claim 1,
   wherein in response to said signal commanding the information write operation sent out from said controller, information corresponding to said signal is stored in said magnetic recording disk in an area provided substantially in a direction radially of said magnetic recording disk.

4. A magnetic disk device according to claim 3,
   wherein a plurality of areas are provided on said magnetic recording disk in a direction radially of said disk.

5. A magnetic disk device adopting a rotary actuator based on an embedded-servo scheme, comprising:
   a plurality of magnetic recording disks supported rotatably and storing discretely reproducible servo information;
   a plurality of magnetic heads for performing information read/write operation for said plurality of magnetic recording disks, respectively;
   an actuator for positioning one of said plurality of magnetic heads relative to one of said plurality of magnetic recording disks on the basis of said servo information;
   a controller for sending out a signal for selecting one of said plurality of magnetic heads and a signal commanding an information writing operation; and
   control circuits for controlling an information read/write operation performed for one of said plurality of magnetic recording disks, a reading operation of servo information from one of said plurality of magnetic recording disks and a driving operation of said actuator;
   wherein said controller, between two consecutive reproductions of said servo information, sends a signal selecting a first magnetic head from said plurality of magnetic heads, a signal instructing a write operation of information, and a signal selecting a second magnetic head different from said first magnetic head and without a characteristic deterioration from said plurality of magnetic heads.

6. A magnetic disk device according to claim 5,
   wherein a time period intervening between said two consecutive reproductions of said servo information is identical with a time period intervening between a second two consecutive reproductions of said servo information.

7. A magnetic disk device adopting a rotary actuator based on an embedded-servo scheme, comprising:

a plurality of magnetic recording disks supported rotatably and storing discretely reproducible servo information;

a plurality of magnetic heads for performing information read/write operation for said plurality of magnetic recording disks, respectively;

an actuator for positioning one of said plurality of magnetic heads relative to one of said plurality of magnetic recording disks on the basis of said servo information;

a controller for sending out a signal for selecting one of said plurality of magnetic heads and a signal commanding an information writing operation; and control circuits for controlling an information read/write operation performed for one of said plurality of magnetic recording disks, a reading operation of servo information from one of said plurality of magnetic recording disk and a driving operation of said actuator;

wherein said controller, between two consecutive reproductions of said servo information, sends a first signal selecting a first magnetic head without characteristic deterioration from said plurality of magnetic heads, a second signal selecting a second magnetic head, a third signal instructing a write operation of information, and a fourth signal selecting said first magnetic head again.

8. A magnetic disk device according to claim 7, wherein a time period intervening between two consecutive reproductions of said servo information is identical to a time period intervening between a second two consecutive reproductions of said servo information.

* * * * *